United States Patent [19]

Russell et al.

[11] Patent Number: 4,845,988

[45] Date of Patent: Jul. 11, 1989

[54] ACCELEROMETER HAVING A PERMANENT MAGNET WITH NON-MAGNETIC END MEMBERS

[75] Inventors: Michael K. Russell, Prestbury; Kenneth S. Evans, Cheltenham, both of England

[73] Assignee: Baroid Technology, Inc., Houston, Tex.

[21] Appl. No.: 152,876

[22] Filed: Feb. 5, 1988

[30] Foreign Application Priority Data

Feb. 21, 1987 [GB] United Kingdom ................. 8704076

[51] Int. Cl.4 ............................................. G01P 15/13
[52] U.S. Cl. .................................. 73/516 R; 73/517 B
[58] Field of Search ......................... 73/516 R, 517 B; 310/90.5

[56] References Cited

U.S. PATENT DOCUMENTS 4,047,439 9/1977 Russell et al. ..................... 73/516 R

OTHER PUBLICATIONS

"Ferrofluids, Physical Properties and Applications", publication by Ferrofluidics Corporation (undated).

Primary Examiner—John Chapman
Attorney, Agent, or Firm—Browning, Bushman, Zamecki & Anderson

[57] ABSTRACT

An accelerometer has a housing defining a chamber, and a magnetisable fluid 11 within the chamber. A permanent magnet is magnetically suspended within the chamber by the magnetisable fluid with its poles oriented along a displacement axis so as to be displaceable from a null position along the displacement axis by an applied force. At least parts of the outer surface of the permanent magnet in the vicinity of its poles are provided with non-magnetisable end members. A sensing arrangement is provided for detecting displacement of the permanent magnet along the displacement axis and for supplying an electrical signal indicative of the applied force. Such an accelerometer is relatively immune to calibration drift and has high measurement accuracy.

10 Claims, 2 Drawing Sheets

ACCELEROMETER HAVING A PERMANENT MAGNET WITH NON-MAGNETIC END MEMBERS

BACKGROUND OF THE INVENTION

This invention relates to accelerometers, and is more particularly, but not exclusively, concerned with accelerometers for use in down-hole instrumentation for surveying a borehole.

U.K. Patent Specification No. 1,492,142 discloses an accelerometer comprising a housing defining a chamber, a magnetizable fluid within the chamber, a permanent magnet magnetically suspended within the chamber by the magnetizable fluid with its poles oriented along a displacement axis and displaceable from a null position along the displacement axis by an applied force, and sensing means for detecting displacement of the permanent magnet along the displacement axis and for supplying an electrical signal indicative of the applied force.

Such an accelerometer requires to be calibrated prior to use, and operates satisfactorily under normal conditions. However, it is found that the required calibration of the accelerometer can tend to drift under the hostile conditions of high temperature and vibration encountered down-hole, and this can lead to inaccuracy in measurement. Such drift can occur even where the accelerometer has been subjected to heat stressing prior to use.

The applicants have examined the possible causes of such drift, and have formulated what they believe to be a reasonable explanation for it, as follows. The magetizable fluid comprises a plurality of magnetizable particles in colloidal suspension within a suspending medium, with the result that the fluid as a whole appears to be magnetizable. Prior to use of the accelerometer downhole, certain of the magnetizable particles tend to migrate under the effect of magnetic attraction towards the outer surface of the permanent magnet so as to form an increased concentration of particles in the vicinity of the poles of the magnet. The accelerometer is calibrated under these conditions. However, when the accelerometer is used down-hole, the effect of the high temperatures encountered will be to reduce the viscosity of the suspending medium of the magnetizable fluid, and the effect of the high vibration and temperature encountered, combined with the reduced viscosity, will cause a change in the concentration of the magnetizable particles in the vicinity of the poles of the magnet. As a result the conditions are changed as compared with those under which the accelerometer was calibrated, and an error is introduced into the measurements. However it is to be appreciated that the above is only put forward as a tentative explanation of such errors, as it is not possible to predict with any certainty at this stage precisely what mechanisms are responsible for the calibration drift, or indeed whether different mechanisms might not be responsible under different conditions.

It is an object of the invention to provide an accelerometer which is capable of improved performance under hostile conditions.

SUMMARY OF THE INVENTION

According to the present invention, there is provided an accelerometer comprising a housing defining a chamber, a magnetizable fluid within the chamber, a permanent magnet magnetically suspended within the chamber by the magnetizable fluid with its poles oriented along a displacement axis and displaceable from a null position along the displacement axis by an applied force, and sensing means for detecting displacement of the permanent magnet along the displacement axis and for supplying an electrical signal indicative of the applied force, wherein at least parts of the outer surface of the permanent magnet in the vicinity of its poles are provided with non-magnetizable end members.

Surprisingly it is found that a very significant reduction in calibration drift is encountered when the accelerometer of the invention is operated downhole as compared with similar accelerometers in which the permanent magnet is not provided with non-magnetizable end members, and the measurement accuracy is increased. One possible explanation for this improved performance is that the provision of the non-magnetizable end members increases the damping of the magnet so that there is a much less pronounced change in the concentration gradient of the particles in the vicinity of the poles when the accelerometer is used down-hole. It might also be expected that the provision of the end members decreases the concentration of magnetizable particles in the immediate vicinity of the poles, with the result that there is less scope for a change in the concentration gradient of the particles when the accelerometer is used down-hole.

In a first embodiment of the invention the end members are formed by at least one sleeve of nonmagnetizable material on the permanent magnet. Advantageously the end members comprise two sleeves of non-magnetizable material provided in the vicinity of the poles of the permanent magnet, each sleeve having a substantially closed end which overlies a respective end surface of the permanent magnet.

The permanent magnet as a whole may be encapsulated in non-magnetizable material, in which case substantially the whole of the outer surface of the permanent magnet will be coated with a layer of nonmagnetizable material.

In another embodiment of the invention the end members are formed by axial extensions of the ends of the permanent magnet. Advantageously at least one of the end members is formed with at least one axial through bore which communicates with a space within the permanent magnet. If required, both of the end members are formed with axial through bores which are interconnected by a passage extending through the permanent magnet.

BRIEF DESCRIPTION OF THE DRAWINGS

In order that the invention may be more fully understood, reference will now be made, by way of example, to the accompanying drawings, in which.

DETAILED DESCRIPTION OF THE DRAWINGS

Figure 1:
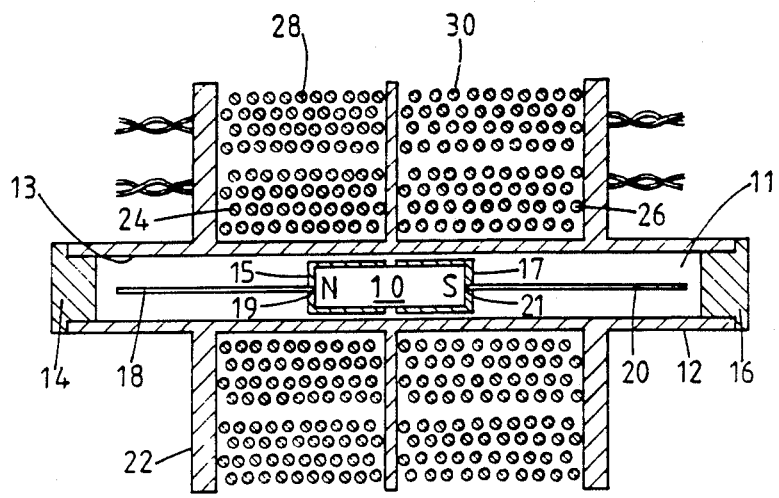
FIG. 1 is an axial section through an accelerometer in accordance with the invention.

Referring to FIG. 1, the illustrated accelerometer comprises a cylindrical permanent magnet 10 magnetically suspended by magnetizable fluid 11 within a cylindrical chamber 13 inside a cylindrical housing 12 having its ends closed by stoppers 14 and 16. The magnetizable fluid 11 is a ferrofluid comprising a colloidal suspension of very small ferromagnetic particles in a liquid, such as a synthetic hydrocarbon carrier. Magnetic interaction between the permanent magnet 10 and the ferromagnetic particles of the magnetizable fluid 11 causes the magnet 10 to be suspended within the fluid 11 out of contact with the wall of the chamber 13.

Two caps 15 and 17 of non-magnetizable material are force fitted over the ends of the magnet 10 so as to form a layer of non-magnetizable material extending over the major portion of the cylindrical outer surface and the end surfaces of the magnet 10. The material of the caps 15 and 17 is preferably a plastics material, such as polyetheretherketone, having low expansibility up to a temperature of about 200° C. Furthermore each of the caps 15 and 17 is formed with a through aperture 19 or 21 in its end surface, and a respective elongate limit member 18 or 20 constituted by a straight wire is fitted within each aperture 19 or 21 and extends outwardly from the end surfaces of the magnet 10 along the longitudinal axis of the chamber 13. The limit members 18 and 20 serve to limit the displacement of the magnet 10 longitudinally of the chamber 13 by engagement with the stoppers 14 and 16.

The outer surface of the housing 12 forms the spindle of a bobbin 22 having two axial spaced sections each of which contains an inner coil 24 or 26 and an outer coil 28 or 30. The radially inner coils 24 and 26 constitute restoring coils and the radially outer coils 28 and 30 constitute sensing coils.

Figure 2:
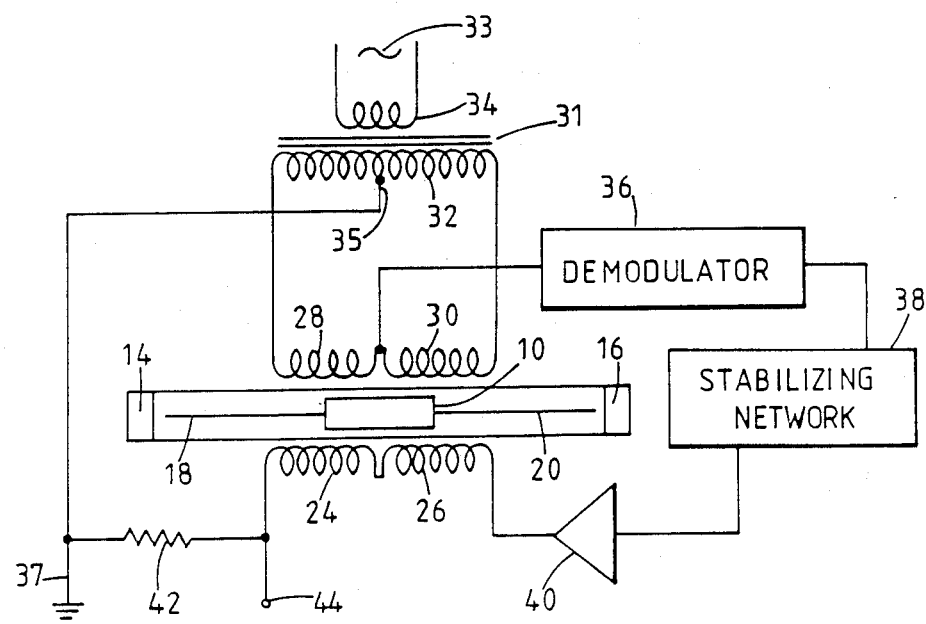
FIG. 2 is a circuit diagram of the accelerometer of FIG. 1, and FIGS. 3 and 4 show two alternative magnet assemblies which may be used in the accelerometer of FIG. 1 in accordance with variants of the invention.

Referring to FIG. 2, the sensing coils 28 and 30 are connected in a circuit to form two of the arms of an inductance bridge, the other two arms of which are formed by a center-tapped secondary winding 32 of a transformer 31 having its primary winding 34 connected to a 1 kHz alternating current supply 33. In addition the common connection point of the sensing coils 28 and 30 is connected to the input of a demodulator 36 which has its output connected to a stabilizing network 38 which may be in the form of a low-pass filter. The output of the stabilizing network 38 is connected by way of a high-gain amplifier 40 to the restoring coils 24 and 26 which are connected in series and wound in such a way that a current passing through the coils 24 and 26 will induce axial magnetic fields which are in opposition. The end of the coil 24 which is not connected to the coil 26 is connected to a terminal 44, and the center tap 35 of the secondary winding 32 of the transformer 31 is connected to an earth terminal 37, a resistance 42 being connected across these two terminals 37 and 44.

In operation of the accelerometer, the sensing coils 28 and 30 are supplied with alternating current from the secondary winding 32 of the transformer 31. When the magnet 10 is in its illustrated null position in which it is symmetrically disposed with respect to the sensing coils 28 and 30, equal and opposite voltages are induced by the alternating current in the sensing coils 28 and 30 due to the symmetrical positioning of the permeable material of the magnet 10, and the two arms of the inductance bridge constituted by these coils 28 and 30 are in balance, so that there is no voltage output to the demodulator 36. However, when the magnet 10 is displaced from its null position by an applied force, the voltages induced in the coils 28 and 30 are no longer equal and an out-of-balance voltage is supplied by the inductance bridge to the input of the demodulator 36. The demodulator 36 provides a direct current output which is proportional to this out-of-balance voltage and which is supplied to the restoring coils 24 and 26 by way of the stabilizing network 38 and the amplifier 40. The direction of the current applied to the restoring coils 24 and 26 is such that the magnet 10 is restored to its null position. Furthermore the potential difference across the resistance 42 between the terminals 37 and 44 is proportional to the axial restoring force and hence is proportional to the applied force acting on the accelerometer.

Since the sensing current is an alternating current and the restoring current is a direct current, it is possible to use common coils to perform both the function of the sensing coils and the function of the restoring coils.

Since any displacement of the magnet 10 due to an applied force is automatically compensated for by the application of a restoring force to the magnet 10, only very small displacements of the magnet 10 will be required in order to obtain an output from the accelerometer. This ensures substantially uniform response of the accelerometer over a wide range of applied force and high accuracy of measurement.

The measurement accuracy of the accelerometer in operation is substantially increased by the provision of the caps 15 and 17 of non-magnetizable material which are believed to have the effect of reducing adherence of ferromagnetic particles from the magnetizable fluid 11 to the outside surface of the magnet 10 which would otherwise lead to calibration drift when the accelerometer is operated down-hole.

Figure 3:
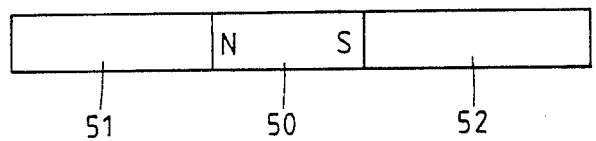

In a variant of the above-described embodiment the magnet assembly, comprising the magnet 10, the caps 15 and 17 and the limit members 18 and 20, is replaced by a permanent magnet 50 to the opposite ends of which are bonded solid plastics end members 51 and 52, as shown in FIG. 3. It will be appreciated that the end members 51 and 52 are of such a length as to render the provision of separate limit members unnecessary.

Figure 4:
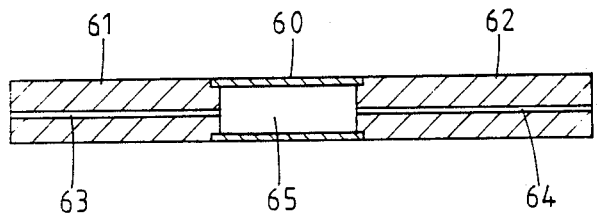

In a further variant of the above-described embodiment the magnet assembly is as illustrated in axial section in FIG. 4. In this assembly the permanent magnet 60 is in the form of a cylindrical sleeve having opposite poles at its axial ends to which are bonded plastics end members 61 and 62 formed with through bores 63 and 64. Whilst the through bores 63 and 64 could be omitted from this construction, it is preferred that at least one such bore is provided in order to allow magnetizable fluid to fill the hollow space 65 within the magnet 60. Most preferably both of the bores 63 and 64 are provided so that fluid communication between the two ends of the chamber 13 occurs by way of a passage having a cross-section which may be chosen to optimize damping of the magnet assembly.

We claim:

1. An accelerometer comprising a housing defining a chamber, a magnetizable fluid within the chamber, a permanent magnet magnetically suspended within the chamber by the magnetizable fluid with its poles oriented along a displacement axis and displaceable from a null position along the displacement axis by an applied force, and sensing means for detecting displacement of the permanent magnet along the displacement axis and for supplying an electrical signal indicative of the applied force, wherein at least parts of the outer surface of the permanent magnet in the vicinity of its poles are provided with nonmagnetizable end members.

2. An accelerometer according to claim 1, wherein the end members are formed by at least one sleeve of nonmagnetizable material on the permanent magnet.

3. An accelerometer according to claim 2, wherein the end members comprise two sleeves of non-magnetizable material provided in the vicinity of the poles of the permanent magnet, each sleeve having a substantially closed end which overlies a respective end surface of the permanent magnet.

4. An accelerometer according to claim 1, wherein the end members are formed by axial extensions of the ends of the permanent magnet.

5. An accelerometer according to claim 4, wherein at least one of the end members is formed with at least one axial through bore which communicates with a space within the permanent magnet.

6. An accelerometer according to claim 4, wherein both of the end members are formed with axial through bores which are interconnected by a passage extending through the permanent magnet.

7. An accelerometer according to claim 4, 5 or 6, wherein the end members are of such an axial extent as to limit the displacement of the permanent magnet by engagement with parts of the housing.

8. An accelerometer according to claim 1, wherein the end members comprise polyetheretherketone.

9. An accelerometer according to claim 1, wherein the sensing means comprises servo means responsive to displacement of the permanent magnet from the null position along the displacement axis by an applied force and arranged to exert a restoring force in response to such displacement to maintain the permanent magnet in the null position and to supply an electrical signal indicative of the restoring force.

10. An accelerometer according to claim 9, wherein the servo means comprises a pair of windings symmetrically disposed with respect to the null position and connected in a bridge circuit, and a circuit responsive to the out-of-balance voltage from the bridge circuit adapted to energize the windings in order to apply the restoring force to the permanent magnet.

* * * * *